(12) United States Patent
Jeddeloh

(10) Patent No.: US 8,564,602 B2
(45) Date of Patent: *Oct. 22, 2013

(54) METHOD OF IMPLEMENTING AN ACCELERATED GRAPHICS PORT FOR A MULTIPLE MEMORY CONTROLLER COMPUTER SYSTEM

(75) Inventor: Joseph Jeddeloh, Minneapolis, MN (US)

(73) Assignee: Round Rock Research, LLC, Jersey City, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/841,376

(22) Filed: Jul. 22, 2010

(65) Prior Publication Data

US 2011/0032261 A1    Feb. 10, 2011

Related U.S. Application Data

(63) Continuation of application No. 11/190,419, filed on Jul. 27, 2005, now Pat. No. 7,777,752, which is a continuation of application No. 10/839,778, filed on May 4, 2004, now Pat. No. 6,947,050, which is a continuation of application No. 09/723,403, filed on Nov. 27, 2000, now Pat. No. 6,741,254, which is a continuation of application No. 09/000,517, filed on Dec. 30, 1997, now Pat. No. 6,157,398.

(51) Int. Cl.
*G09G 5/39* (2006.01)
*H05K 13/00* (2006.01)

(52) U.S. Cl.
USPC .......................................... 345/532; 345/503

(58) Field of Classification Search
USPC .......... 345/532, 503, 519, 536, 541, 543, 568
See application file for complete search history.

(56) References Cited

U.S. PATENT DOCUMENTS 4,016,545 A    4/1977   Lipovski
4,429,363 A    1/1984   Duke et al.
(Continued)

FOREIGN PATENT DOCUMENTS

EP    0710913 A1    5/1996
EP    0803807 A2    10/1997
(Continued)

OTHER PUBLICATIONS

Accelerated Graphics Port Interface Specification, Revision, 1.0, Intel Corporation, Jul. 31, 1996.

(Continued)

*Primary Examiner* — Ulka Chauhan
*Assistant Examiner* — Patrick F Valdez
(74) *Attorney, Agent, or Firm* — Lerner, David, Littenberg, Krumholz & Mentlik, LLP

(57) ABSTRACT

An architecture for storing, addressing and retrieving graphics data from one of multiple memory controllers. In a first embodiment of the invention, one of the memory controllers having an accelerated graphics port (AGP) includes a set of registers defining a range of addresses handled by the memory controller that are preferably to be used for all AGP transactions. The AGP uses a graphics address remapping table (GART) for mapping memory. The GART includes page table entries having translation information to remap virtual addresses falling within the GART range to their corresponding physical addresses. In a second embodiment of the invention, a plurality of the memory controllers have an AGP, wherein each of the plurality of the memory controllers supplies a set of registers defining a range of addresses that is preferably used for AGP transactions. In a third embodiment of the invention, a plurality of memory controllers implemented on a single chip each contain an AGP and a set of configuration registers identifying a range of addresses that are preferably used for AGP transactions.

17 Claims, 7 Drawing Sheets

(56) References Cited

U.S. PATENT DOCUMENTS

| | | | |
|---|---|---|---|
| 4,507,730 A | 3/1985 | Johnson et al. | |
| 4,937,734 A | 6/1990 | Bechtolsheim | |
| 4,969,122 A | 11/1990 | Jensen | |
| 5,109,520 A | 4/1992 | Knierim | |
| 5,121,487 A | 6/1992 | Bechtolsheim | |
| 5,133,058 A | 7/1992 | Jensen | |
| 5,155,816 A | 10/1992 | Kohn | |
| 5,222,222 A | 6/1993 | Mehring et al. | |
| 5,263,142 A | 11/1993 | Watkins et al. | |
| 5,265,213 A | 11/1993 | Weiser et al. | |
| 5,265,227 A | 11/1993 | Kohn et al. | |
| 5,265,236 A | 11/1993 | Mehring et al. | |
| 5,305,444 A | 4/1994 | Becker et al. | |
| 5,313,577 A | 5/1994 | Meinerth et al. | |
| 5,315,696 A | 5/1994 | Case et al. | |
| 5,315,698 A | 5/1994 | Case et al. | |
| 5,321,806 A | 6/1994 | Meinerth et al. | |
| 5,321,807 A | 6/1994 | Mumford | |
| 5,321,810 A | 6/1994 | Case et al. | |
| 5,321,836 A | 6/1994 | Crawford et al. | |
| 5,361,340 A | 11/1994 | Kelly et al. | |
| 5,386,547 A | 1/1995 | Jouppi | |
| 5,392,393 A | 2/1995 | Deering | |
| 5,396,614 A | 3/1995 | Khalidi et al. | |
| 5,408,605 A | 4/1995 | Deering | |
| 5,408,629 A * | 4/1995 | Tsuchiya et al. | 711/151 |
| 5,414,821 A | 5/1995 | Nguyen et al. | |
| 5,426,750 A | 6/1995 | Becker et al. | |
| 5,440,682 A | 8/1995 | Deering | |
| 5,442,755 A | 8/1995 | Shibata | |
| 5,446,854 A | 8/1995 | Khalidi et al. | |
| 5,465,337 A | 11/1995 | Kong | |
| 5,479,627 A | 12/1995 | Khalidi et al. | |
| 5,491,806 A | 2/1996 | Horstmann et al. | |
| 5,500,948 A | 3/1996 | Hinton et al. | |
| 5,524,233 A | 6/1996 | Milburn et al. | |
| 5,542,062 A | 7/1996 | Taylor et al. | |
| 5,546,555 A | 8/1996 | Horstmann et al. | |
| 5,548,739 A | 8/1996 | Yung | |
| 5,553,023 A | 9/1996 | Lau et al. | |
| 5,568,620 A | 10/1996 | Sarangdhar et al. | |
| 5,579,493 A | 11/1996 | Kiuchi et al. | |
| 5,584,014 A | 12/1996 | Nayfeh et al. | |
| 5,586,283 A | 12/1996 | Lopez-Aguado et al. | |
| 5,594,882 A | 1/1997 | Bell | |
| 5,615,343 A | 3/1997 | Sarangdhar et al. | |
| 5,617,554 A | 4/1997 | Alpert et al. | |
| 5,623,627 A | 4/1997 | Witt | |
| 5,630,094 A | 5/1997 | Hayek et al. | |
| 5,632,021 A | 5/1997 | Jennings et al. | |
| 5,664,161 A | 9/1997 | Fukushima et al. | |
| 5,664,162 A | 9/1997 | Dye | |
| 5,675,750 A | 10/1997 | Matsumoto et al. | |
| 5,675,762 A | 10/1997 | Bodin et al. | |
| 5,678,009 A | 10/1997 | Bains et al. | |
| 5,678,026 A | 10/1997 | Vartti et al. | |
| 5,682,516 A | 10/1997 | Sarangdhar et al. | |
| 5,721,864 A | 2/1998 | Chiarot et al. | |
| 5,724,549 A | 3/1998 | Selgas et al. | |
| 5,737,765 A | 4/1998 | Shigeeda | |
| 5,761,444 A | 6/1998 | Ajanovic et al. | |
| 5,761,462 A | 6/1998 | Neal et al. | |
| 5,761,727 A * | 6/1998 | Wu et al. | 711/147 |
| 5,774,685 A | 6/1998 | Dubey | |
| 5,778,197 A | 7/1998 | Dunham | |
| 5,778,425 A | 7/1998 | Shigeeda | |
| 5,802,603 A | 9/1998 | Bains et al. | |
| 5,809,522 A | 9/1998 | Novak et al. | |
| 5,815,167 A | 9/1998 | Muthal et al. | |
| 5,829,032 A | 10/1998 | Komuro et al. | |
| 5,829,038 A | 10/1998 | Merrell et al. | |
| 5,845,327 A | 12/1998 | Rickard et al. | |
| 5,854,637 A | 12/1998 | Sturges | |
| 5,854,638 A | 12/1998 | Tung | |
| 5,854,837 A | 12/1998 | Trader et al. | |
| 5,860,101 A | 1/1999 | Arimilli et al. | |
| 5,861,893 A | 1/1999 | Sturgess | |
| 5,867,180 A | 2/1999 | Katayama et al. | |
| 5,870,567 A | 2/1999 | Hausauer et al. | |
| 5,875,462 A | 2/1999 | Bauman et al. | |
| 5,881,253 A | 3/1999 | Seeman | |
| 5,889,970 A | 3/1999 | Horan et al. | |
| 5,892,964 A | 4/1999 | Horan et al. | |
| 5,909,559 A | 6/1999 | So | |
| 5,911,051 A | 6/1999 | Carson et al. | |
| 5,911,149 A | 6/1999 | Luan et al. | |
| 5,913,923 A * | 6/1999 | Dunlap et al. | 710/100 |
| 5,914,727 A * | 6/1999 | Horan et al. | 345/503 |
| 5,915,285 A | 6/1999 | Sommer | |
| 5,930,827 A | 7/1999 | Sturges | |
| 5,933,158 A | 8/1999 | Santos et al. | |
| 5,937,171 A | 8/1999 | Sarangdhar et al. | |
| 5,960,455 A * | 9/1999 | Bauman | 711/120 |
| 5,990,911 A | 11/1999 | Arrott et al. | |
| 5,999,183 A | 12/1999 | Kilgariff et al. | |
| 5,999,743 A | 12/1999 | Horan et al. | |
| 6,002,411 A * | 12/1999 | Dye | 345/542 |
| 6,008,823 A | 12/1999 | Rhoden et al. | |
| 6,026,464 A | 2/2000 | Cohen | |
| 6,069,638 A | 5/2000 | Porterfield | |
| 6,070,231 A | 5/2000 | Ottinger | |
| 6,118,462 A * | 9/2000 | Margulis | 345/535 |
| 6,157,398 A | 12/2000 | Jeddeloh | |
| 6,230,223 B1 | 5/2001 | Olarig | |
| 6,233,665 B1 | 5/2001 | Bolyn | |
| 6,233,702 B1 | 5/2001 | Horst et al. | |
| 6,249,853 B1 | 6/2001 | Porterfield | |
| 6,252,612 B1 | 6/2001 | Jeddeloh | |
| 6,282,625 B1 | 8/2001 | Porterfield | |
| 6,317,803 B1 | 11/2001 | Rasmussen et al. | |
| 6,717,582 B2 | 4/2004 | Jeddeloh | |
| 6,718,375 B1 | 4/2004 | Hornung et al. | |
| 6,741,254 B1 | 5/2004 | Jeddeloh | |

FOREIGN PATENT DOCUMENTS

| | | |
|---|---|---|
| EP | 1044411 A1 | 10/2000 |
| WO | 9202879 A1 | 2/1992 |
| WO | 97/04396 A1 | 2/1997 |
| WO | 9726604 A1 | 7/1997 |

OTHER PUBLICATIONS

Communication Regarding the Expiry of the Time Limit Within Which Notice of Opposition May be Filed, dated Mar. 8, 2004, for EF Patent Application No. 98965536.0.

Communication Under Rule 51(4) EPC, dated Aug. 14, 2002, for ER Patent Application No. 98965536.0!

Comrnunicaflon Pursuant to Art. 96(2) EPC, dated Sep. 7, 2001, for EP Patent Application No. 98965536.0.

Decision to Grant a European Patent Pursuant to Art, 97(2) EPC, dated Mar. 20, 2003, for EP Patent Application No. 98965536.0.

Intel Advance Information "Intel 440 LX AGPSET: 82443LX PCI A.G.P. Controller (PAC)," Aug. 1997, 118 pp.

Invitation Pursuant to Art. 96(2) and Rule 51(2) EPC, dated Jan. 29, 2002, for EP Patent Application No. 98965536.0!

Invitation to Correct Defects in the International Application! dated Feb. 4, 1999, for International Patent Application PCT/US98/27791.

LSI Logic L64852 Mbus-to-Sbus Controller (M2S) Technical Manual. LSI Logic corporation (1993).

Notification Concerning Informal Communications with the Applicant, dated Jan. 20, 2000, for International Patent Application PCT/US98/27791.

Notification Concerning Information Communications with the Applicant! dated Feb. 28, 2000, for International Patent Application PCT/US9S/27791.

Notification of Transmittai of the International Search Report or the Declaration, International Search Report, dated May 4, 1999, for International Patent Application PCT/US98/27791!

Notification of Transmittal of the International Preliminary Examination Report, International Preliminary Examination Report, dated Apr. 11, 2000, for International Patent Application PCT/US98/27791.

(56) References Cited

OTHER PUBLICATIONS

Request for Examination and Voluntary Amendment and Identification of Cited References, dated 06/2712005, for Canadian Patent Appl. No. 2,313,257!

Response to Art. 96(2) Communication, dated Jan. 16, 2002, for EP Patent Application No. 98965536.0.

Response to Written Opinion, dated Mar. 15, 2000, for International Patent Application PCT/US9B/27791.

Response to Written Opinion, dated Dec. 22, 1999, for International Patent Application PCT/US98/27791.

Written Opinion, dated Sep. 23, 1999, for International Patent Application FCT/US98/27791.

* cited by examiner

METHOD OF IMPLEMENTING AN ACCELERATED GRAPHICS PORT FOR A MULTIPLE MEMORY CONTROLLER COMPUTER SYSTEM

CROSS-REFERENCE TO RELATED APPLICATIONS

This patent application is a continuation of U.S. patent application Ser. No. 11/190,419, filed Jul. 27, 2005, now U.S. Pat. No. 7,777,752, which is a continuation of U.S. patent application Ser. No. 10/839,778, filed May 4, 2004, now U.S. Pat. No. 6,947,050, which is a continuation of U.S. patent application Ser. No. 09/723,403, filed Nov. 27, 2000, now U.S. Pat. No. 6,741,254, which is a continuation of U.S. patent application Ser. No. 09/000,517, filed on Dec. 30, 1997, now U.S. Pat. No. 6,157,398, the entirety of which are hereby incorporated herein by reference.

The patent and patent applications listed below are related to the present application, and are each hereby incorporated by reference in their entirety.

ACCELERATED GRAPHICS PORT FOR A MULTIPLE MEMORY CONTROLLER COMPUTER SYSTEM, U.S. patent application Ser. No. 10/776,439, filed Feb. 10, 2004.

ACCELERATED GRAPHICS PORT FOR A MULTIPLE MEMORY CONTROLLER COMPUTER SYSTEM, U.S. patent application Ser. No. 09/892,917, filed Jun. 26, 2001, now U.S. Pat. No. 6,717,582.

SYSTEM FOR ACCELERATED GRAPHICS PORT ADDRESS REMAPPING INTERFACE TO MAIN MEMORY, U.S. patent application Ser. No. 08/882,428, filed on Jun. 25, 1997, now U.S. Pat. No. 6,069,638.

ACCELERATED GRAPHICS PORT FOR MULTIPLE MEMORY CONTROLLER COMPUTER SYSTEM, U.S. patent application Ser. No. 09/000,511, filed on Dec. 30, 1997, now U.S. Pat. No. 6,252,612.

GART AND PTES DEFINED BY CONFIGURATION REGISTER, U.S. patent application Ser. No. 08/882,054, filed on Jun. 25, 1997, now U.S. Pat. No. 6,249,853.

METHOD FOR ACCELERATED GRAPHICS PORT ADDRESS REMAPPING INTERFACE TO MAIN MEMORY, U.S. patent application Ser. No. 08/882,327, filed on Jun. 25, 1997, now U.S. Pat. No. 6,282,625.

BACKGROUND OF THE INVENTION

The present invention relates to computer systems, and more particularly, to a method of using a second memory controller having an accelerated graphics port.

As shown in FIG. 1, a conventional computer system architecture 100 includes a processor 102, system logic 104, main memory 106, a system bus 108, a graphics accelerator 110 communicating with a local frame buffer 112 and a plurality of peripherals 114. The processor 102 communicates with main memory 106 through a memory management unit (MMU) in the processor 102. Peripherals 114 and the graphics accelerator 110 communicate with main memory 106 and system logic 104 through the system bus 108. The standard system bus 108 is currently the Peripherals Component Interface (PCI). The original personal computer bus, the Industry Standard Architecture (ISA), is capable of a peak data transfer rate of 8 megabytes/sec and is still used for low-bandwidth peripherals, such as audio. On the other hand, PCI supports multiple peripheral components and add-in cards at a peak bandwidth of 132 megabytes/sec. Thus, PCI is capable of supporting full motion video playback at 30 frames/sec, true color high-resolution graphics and 100 megabits/sec Ethernet local area networks. However, the emergence of high-bandwidth applications, such as three dimensional (3D) graphics applications, threatens to overload the PCI bus.

For example, a 3D graphics image is formed by taking a two dimensional image and applying, or mapping, it as a surface onto a 3D object. The major kinds of maps include texture maps, which deal with colors and textures, bump maps, which deal with physical surfaces, reflection maps, refraction maps and chrome maps. Moreover, to add realism to a scene, 3D graphics accelerators often employ a z-buffer for hidden line removal and for depth queuing, wherein an intensity value is used to modify the brightness of a pixel as a function of distance. A z-buffer memory can be as large or larger than the memory needed to store two dimensional images. The graphics accelerator 110 retrieves and manipulates image data from the local frame buffer 112, which is a type of expensive high performance memory. For example, to transfer an average 3D scene (polygon overlap of three) in 16-bit color at 30 frames/sec at 75 Hz screen refresh, estimated bandwidths of 370 megabytes/sec to 840 megabytes/sec are needed for screen resolutions from 640×480 resolution (VGA) to 1024×768 resolution (XGA). Thus, rendering of 3D graphics on a display requires a large amount of bandwidth between the graphics accelerator 110 and the local frame buffer 112, where 3D texture maps and z-buffer data typically reside.

In addition, many computer systems use virtual memory systems to permit the processor 102 to address more memory than is physically present in the main memory 106. A virtual memory system allows addressing of very large amounts of memory as though all of that memory were a part of the main memory of the computer system. A virtual memory system allows this even though actual main memory may consist of some substantially lesser amount of storage space than is addressable. For example, main memory may include sixteen megabytes (16,777,216 bytes) of random access memory while a virtual memory addressing system permits the addressing of four gigabytes (4,294,967,296 bytes) of memory.

Virtual memory systems provide this capability using a memory management unit (MMU) to translate virtual memory addresses into their corresponding physical memory addresses, where the desired information actually resides. A particular physical address holding desired information may reside in main memory or in mass storage, such as a tape drive or hard disk. If the physical address of the information is in main memory, the information is readily accessed and utilized. Otherwise, the information referenced by the physical address is in mass storage and the system transfers this information (usually in a block referred to as a page) to main memory for subsequent use. This transfer may require the swapping of other information out of main memory into mass storage in order to make room for the new information. If so, the MMU controls the swapping of information to mass storage.

Pages are the usual mechanism used for addressing information in a virtual memory system. Pages are numbered, and both physical and virtual addresses often include a page number and an offset into the page. Moreover, the physical offset and the virtual offset are typically the same. In order to translate between the virtual and physical addresses, a basic virtual memory system creates a series of lookup tables, called page tables, stored in main memory. These page tables store the virtual address page numbers used by the computer. Stored with each virtual address page number is the corresponding physical address page number which must be accessed to obtain the information. Often, the page tables are so large that they are paged themselves. The page number of any virtual address presented to the memory management unit is compared to the values stored in these tables in order to find a matching virtual address page number for use in retrieving the corresponding physical address page number.

There are often several levels of tables, and the comparison uses a substantial amount of system clock time. For example, to retrieve a physical page address using lookup tables stored in main memory, the typical MMU first looks to a register for the address of a base table which stores pointers to other levels of tables. The MMU retrieves this pointer from the base table and places it in another register. The MMU then uses this pointer to go to the next level of table. This process continues until the physical page address of the information sought is recovered. When the physical address is recovered, it is combined with the offset furnished as a part of the virtual address and the processor uses the result to access the particular information desired. Completion of a typical lookup in the page tables may take from ten to fifteen clock cycles at each level of the search. Such performance is unacceptable in processing graphical applications.

One solution to facilitate the processing of graphical data includes having a point to point connection between the memory controller and a graphics accelerator. Such an architecture is defined by the *Accelerated Graphics Port Interface Specification, Revision* 1.0, (Jul. 31, 1996) released by Intel Corporation. However, one problem with these systems is that the PCI bus acts as a bottleneck for all memory transactions. Computer manufacturers are in need of a system to eliminate this bottleneck.

Other solutions to facilitate the access of memory exist. The U.S. Pat. No. 4,016,545 to Lipovski teaches the use of multiple memory controllers. However, Lipovski does not describe a point to point connection between a memory controller and a graphics accelerator. Such a connection is needed for the high speed processing of graphic data.

Additionally, U.S. Pat. No. 4,507,730 to Johnson teaches the use of multiple memory controllers. However, Johnson uses multiple memory controllers for fault tolerance. In Johnson, once a memory controller is found to be faulty, it is switched off line and another memory controller is activated in its place. The memory controllers in Johnson do not facilitate the efficient transfer of memory for graphic applications.

In view of the limitations discussed above, computer manufacturers require an architecture with improved methods for storing, addressing and retrieving graphics data from main memory. Moreover, to address the needs of high bandwidth graphics applications without substantial increases in system cost, computer manufacturers require improved technology to overcome current system bus bandwidth limitations.

BRIEF SUMMARY OF THE INVENTION

One embodiment of the invention is a method of manufacturing a multiple memory controller computer comprising connecting at least two memory controllers to at least one processing unit; and connecting at least one configuration register to one of the at least two memory controllers, wherein the at least one configuration register defines a range of addresses that are available for accelerated graphic port transactions.

Yet another embodiment of the invention is a method of using a multiple memory controller system, comprising storing a graphical address remapping table in a memory on a computer system having at least two memory controllers; connecting a graphics accelerator to a memory controller which has at least one configuration register that defines a range of addresses that are available for accelerated graphics port transactions; and storing a graphics address relocation table in a memory connected to said memory controller having at least one configuration register.

DETAILED DESCRIPTION

The following detailed description presents a description of certain specific embodiments of the invention. However, the invention can be embodied in a multitude of different ways as defined and covered by the claims. In this description, reference is made to the drawings wherein like parts are designated with like numerals throughout.

Figure 2:
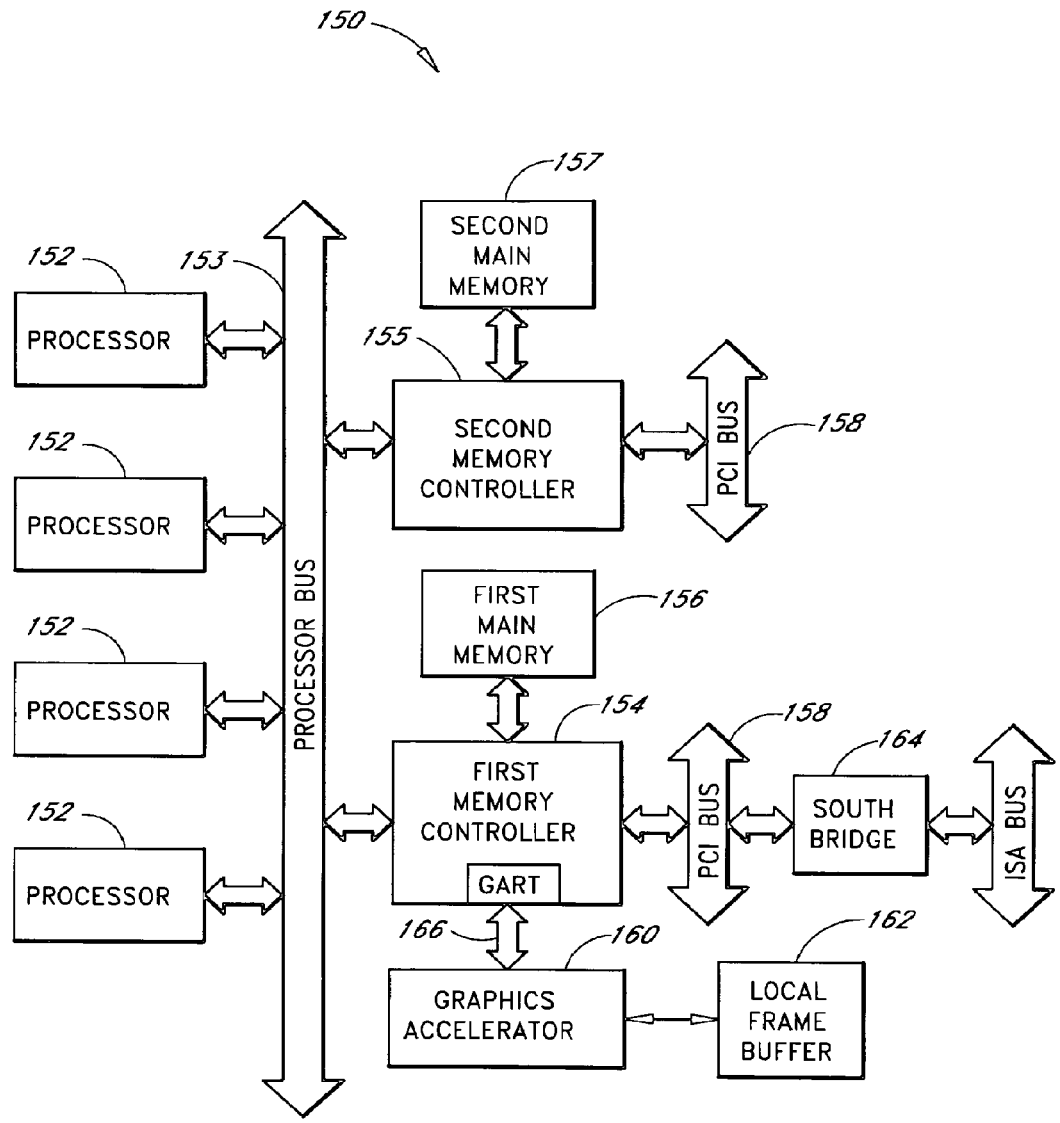
FIG. 2 is a block diagram illustrating one embodiment of a computer system of the invention.

FIG. 2 is a block diagram illustrating a computer system of one embodiment of the invention. This computer 150 includes at least one processor 152 connected to a first memory controller 154 and a second memory controller 155 by a processor or host bus. The computer 150 also has a first main memory 156 and a second main memory 157 connected to the first memory controller 154 and the second memory controller 155, respectively. A graphics accelerator 160 communicates with a local frame buffer 162 and the first memory controller 154 through an accelerated graphics port (AGP) 166. The AGP 166 is not a bus, but is a point-to-point connection between an AGP compliant target, which is the first memory controller 154, and an AGP-compliant master, which is the graphics accelerator 160. The AGP 166 point-to-point connection enables data transfer on both the rising and falling clock edges, improves data integrity, simplifies AGP protocols, and eliminates bus arbitration overhead. AGP provides a protocol enhancement enabling pipelining for read and write accesses to the main memory 156. The first memory controller 154 and the second memory controller 155 also accept memory requests from a PCI bus 158.

As noted above, the embodiment of FIG. 2 enables the graphics accelerator 160 to access both the first main memory 156 and the local frame buffer 162. From the perspective of the graphics accelerator 160, the main memory 156 and the local frame buffer 162 are logically equivalent. Thus, to optimize system performance, graphics data may be stored in either the first main memory 156 or the local frame buffer 162. In contrast to the direct memory access (DMA) model where graphics data is copied from the main memory 156 into the local frame buffer 162 by a long sequential block transfer prior to use, the graphics accelerator 160 of the present invention can also use, or "execute," graphics data directly from the memory in which it resides (the "execute" model).

The interface between the first memory controller 154 and the graphics accelerator 160 is defined by *Accelerated Graphics Port Interface Specification, Revision* 1.0, (Jul. 31, 1996) released by Intel Corporation and available from Intel in Adobe® Acrobat® format on the World Wide Web at the URL: developer.intel.com/pc-supp/platform/agfxport/IN-DEX.htm. This document is hereby incorporated by reference.

Figure 3:
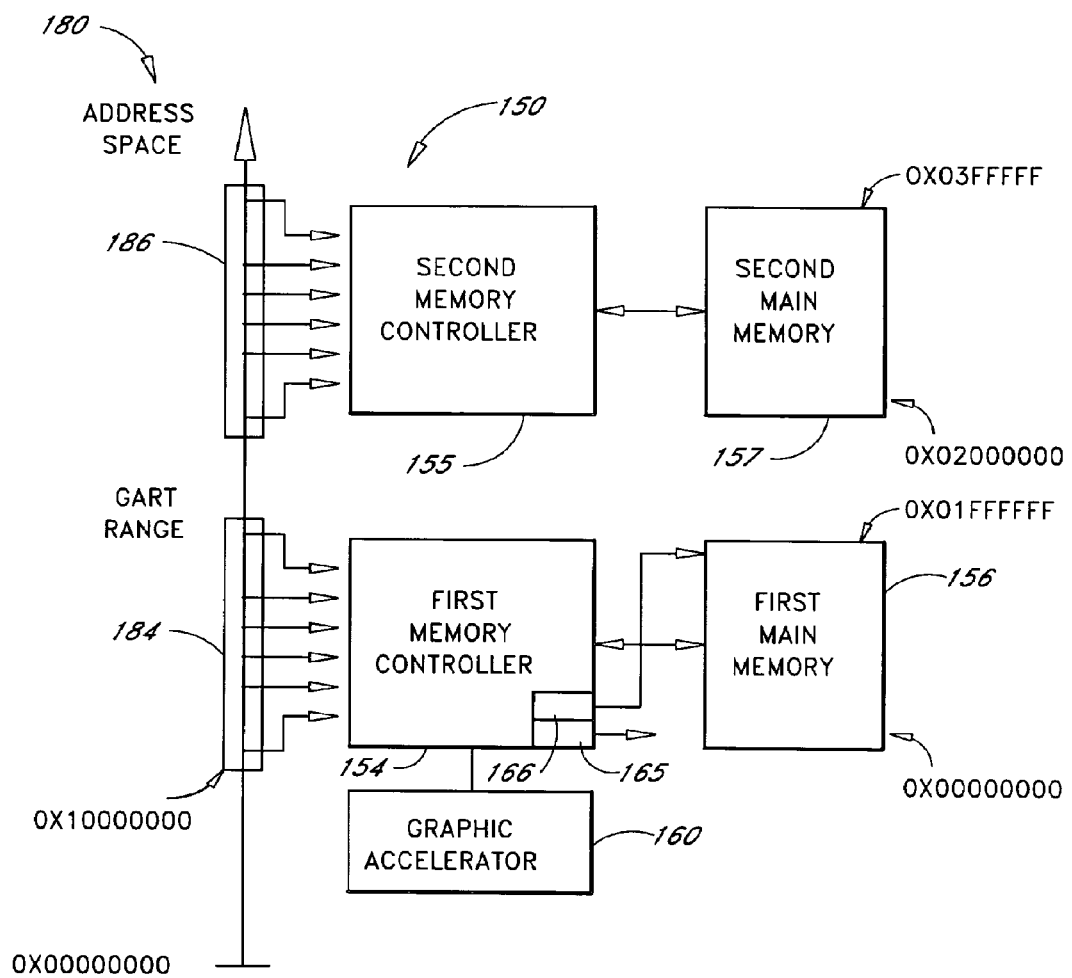
FIG. 3 is a block diagram illustrating the address space of a processor of one embodiment of the invention.

FIG. 3 illustrates an embodiment of the address space 180 of the computer system 150 (FIG. 2) of the invention. For example, a 32 bit processor 152 (FIG. 2) has an address space 180 including $2^{32}$ (or 4,294,967,296) different addresses. A computer system 150 (FIG. 2) typically uses different ranges of the address space 180 for different devices and system agents. In one embodiment, the address space 180 includes a graphics address remapping table (GART) range 184 and a main memory range 186.

The first memory controller 154 provides a set of registers to define the range of available for AGP transactions. A base register 165 is used to define the base address of the AGP addresses. A range register 166 is used to establish the amount of memory following the base address that is dedicated to AGP transactions. Alternatively, a lower and upper address register may be used to define the AGP address range. An operating system provided with these values will attempt to allocate GART pages within this memory range. In contrast to prior art systems, the operating system attempts to first remap the addresses falling within the GART range 184 to the first memory controller 154.

By employing a first and second main memory 156, 157 respectively, and two memory controllers 154, 155 faster transaction processing is realized than in those prior art systems employing a single system memory and a single memory controller. In particular, two memory transactions can be executed simultaneously by executing one transaction using the first memory controller 154 while another transaction is being executed by the second memory controller 155. Graphics data typically is read many times without ever being changed or written to. Read and write delays are reduced by storing the graphic data in the first memory controller 154, while storing other data in the second memory controller 155.

Referring again to FIG. 3, the computer 150 has 64 megabytes of main memory 156,157 encompassing physical addresses 0 through 0x03FFFFFF. 32 megabytes of memory are assigned to the first memory controller 154 and 32 megabytes are assigned to the second memory controller 155. Using the base 165 and range 166 registers provided by the first memory controller 154, the operating system has set the AGP related data occupying the lower 32 megabytes of the first main memory 156 referenced by physical addresses 0x00000000 through 0x01FFFFFF. For example, if the GART Range 184 begins at the 256 megabyte virtual address boundary 0x10000000, the invention enables translation of virtual addresses within the GART Range 184 to physical addresses in the lower 32 megabytes of the first main memory 156 corresponding to physical addresses in the range 0x00000000 through 0x01FFFFFF.

Upon a request from the graphics accelerator 160, the first memory controller 154 analyzes the address in the request to identify whether the address is in the first main memory 156. If the address is not within the first main memory 156, the first memory controller 154 re-routes the request to the second memory controller 155. By having the GART tables and their referenced memory located on the first memory controller 154 having the AGP, the re-routing of memory requests to the other memory controller 155 is minimized.

In one embodiment, a hardware abstraction layer (HAL) directs the operating system to place the GART table and texture memory in the first memory controller 154. The HAL is a small layer of software that presents the rest of the computer system with an abstract model of any hardware that is not part of the processors 152. The HAL hides platform-specific details from the rest of the system and removes the need to have different versions of the operating system for platforms from different vendors.

Figure 4:
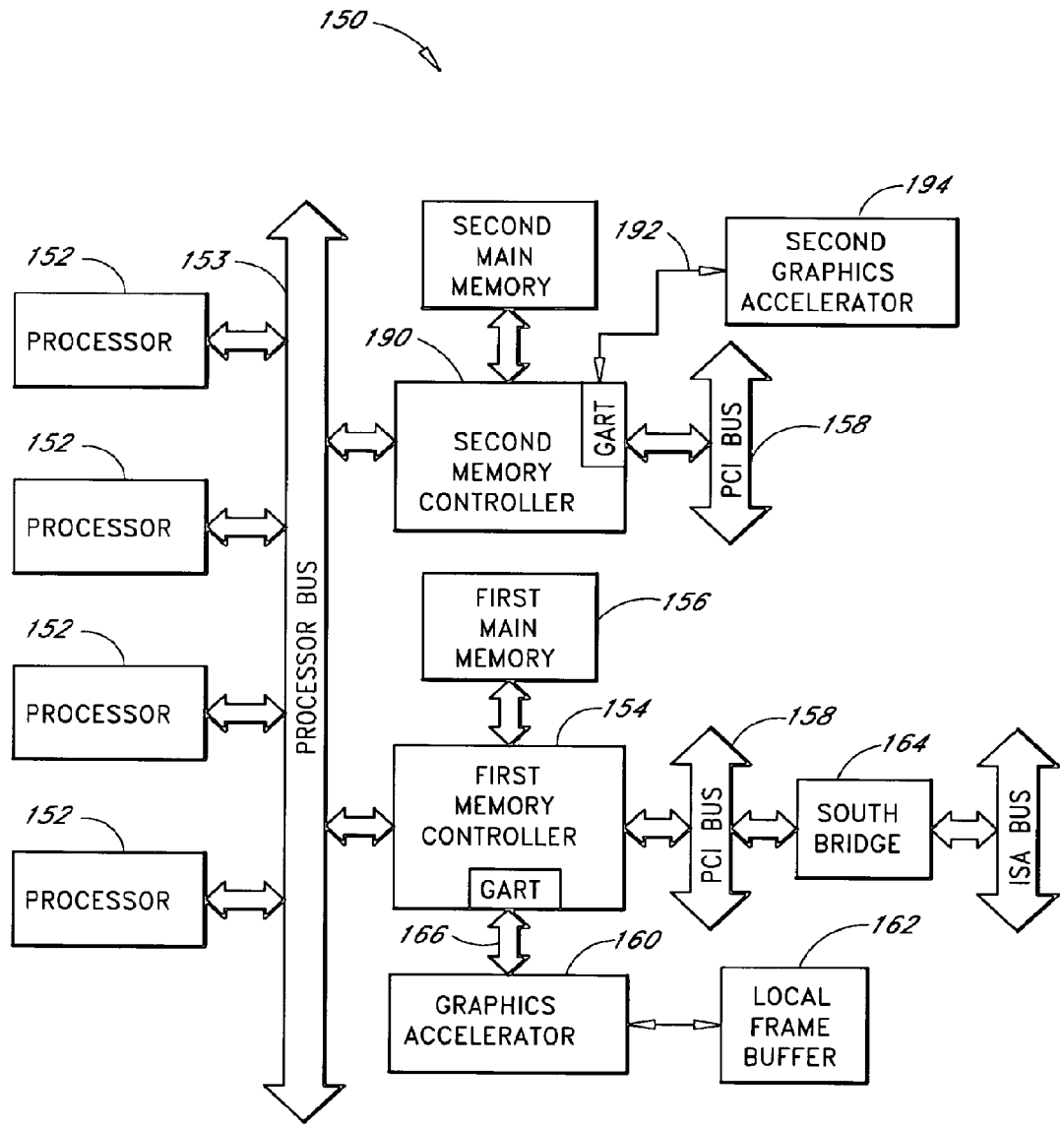
FIG. 4 is a block diagram illustrating a second embodiment of the invention.

Referring to FIG. 4, a second embodiment of the invention is illustrated. This second embodiment has a second memory controller 190 also having an accelerated graphics port 192 for use by a graphics accelerator 194. Each of the memory controllers 154, 190 provide a set of registers defining a range of addresses that are used by the operating system for accelerated graphics port transactions. In a third embodiment of the invention, a single chip contains a plurality of memory controllers each memory controller having an AGP and a set of configuration registers identifying a range of addresses that are used for AGP transactions.

Figure 5:
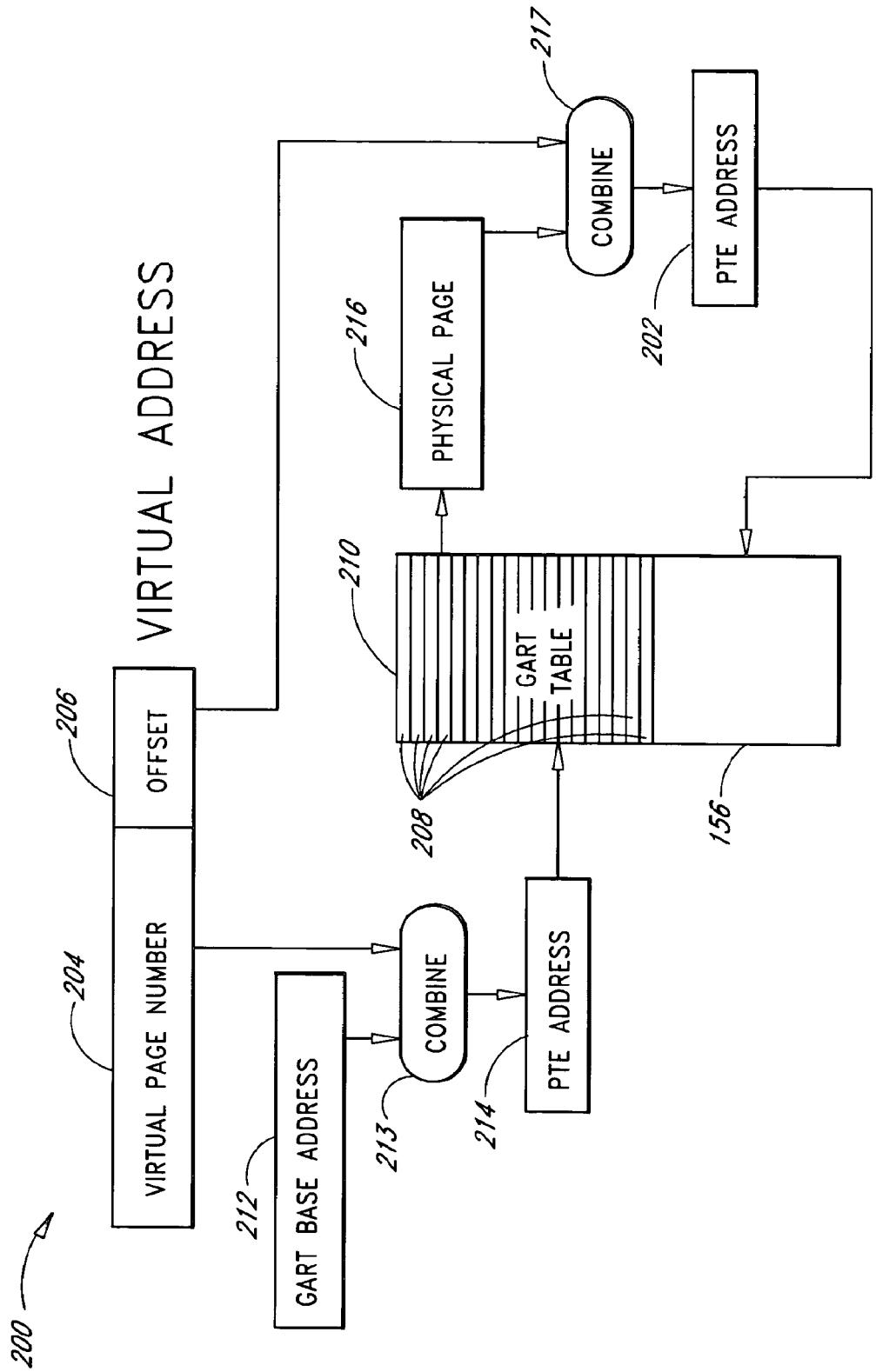
FIG. 5 is a block diagram illustrating the translation of a virtual address to a physical address of one embodiment of the invention.

FIG. 5 illustrates the translation of a virtual address 200 to a physical address 202 in one embodiment of the invention. As discussed previously, in one embodiment, the operating system attempts to allocate those virtual addresses falling within the GART range 184 (FIG. 3) to the first main memory 156 (FIG. 3).

A virtual address 200 includes a virtual page number field 204 and an offset field 206. Translation of the contents of the virtual page number field 204 occurs by finding a page table entry (PTE) corresponding to the virtual page number field 204 among the plurality of GART PTEs 208 in the GART table 210. To identify the appropriate PTE having the physical address translation, the GART base address 212 is combined at a state 213 with the contents of the virtual page number field 204 to obtain a PTE address 214. The contents referenced by the PTE address 214 provide the physical page number 216 corresponding to the virtual page number 204. The physical page number 216 is then combined at a state 217 with the contents of the offset field 206 to form the physical address 202. The physical address 202 in turn references a location in the first main memory 156 having the desired information.

The GART table 210 may include a plurality of PTEs 208 having a size corresponding to the memory page size used by the processors 152 (FIG. 2). For example, an Intel® Pentium® or Pentium® Pro processor operates on memory pages having a size of 4K. Thus, a GART table 210 adapted for use with these processors may include PTEs referencing 4K pages. In one embodiment, the virtual page number field 204 comprises the upper 20 bits and the offset field 206 comprises the lower 12 bits of a 32 bit virtual address 200. Thus, each page includes $2^{12}$=4096 (4K) addresses and the lower 12 bits of the offset field 206 locate the desired information within a page referenced by the upper 20 bits of the virtual page number field 204.

Figure 6:
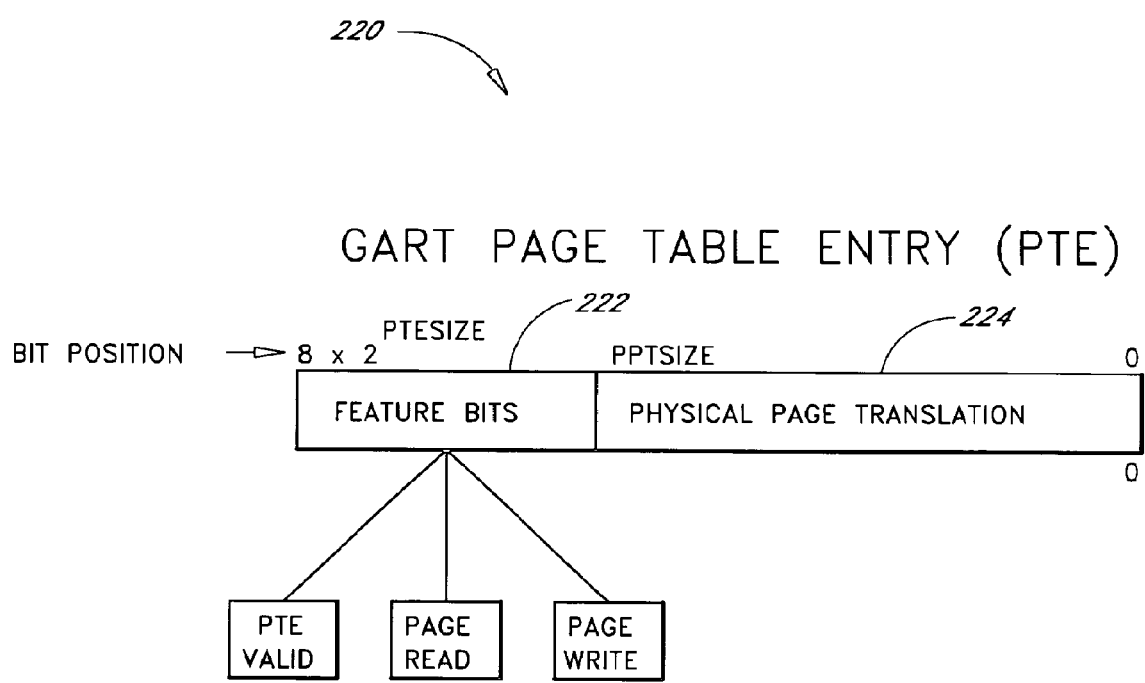
FIG. 6 is an illustration of a page table entry of the graphics address remapping table of one embodiment of the invention.

FIG. 6 illustrates one possible format for a GART PTE 220. The GART PTE 220 includes a feature bits field 222 and a physical page translation (PPT) field 224. In contrast to prior art systems where hardwired circuitry defines a page table format, the GART table 210 (FIG. 5) may include PTEs of configurable length enabling optimization of table size and the use of feature bits defined by software. The PPT field 224 includes PPTSize bits to generate a physical address 202 (FIG. 5). The PPTSize defines the number of translatable addresses.

In one embodiment, an initialization BIOS implements the GART table 210 (FIG. 5) by loading configuration registers in the first memory controller 154 (FIG. 2) during system boot up. In another embodiment, the operating system implements the GART table 210 (FIG. 5) using an API to load the configuration registers in the first memory controller 154 (FIG. 3) during system boot up.

As noted earlier, a GART table 210 includes multiple PTEs, each having physical page translation information 224 and software feature bits 222. The GART table 210 may be located at any physical address in the main memory 218, such as the 2 megabyte physical address 0x00200000. The operating system attempts to place the GART table 210 in the memory range provided by the registers 165, 166 in the first memory controller 154 if space is available. By placing the GART table 210 in this memory range, fewer memory requests from the graphic accelerator 160 need to travel over the PCI bus 158 to the second memory controller 166 as compared to traditional systems. For a system having a 4K memory page size and a GART PTE 220 of 8 byte length, the GART table 210 is configured as follows:

PhysBase:=0x00000000—Start of remapped physical address
PhysSize:=32 megabytes—Size of remapped physical addresses
AGPAperture:=0x10000000—Start address of GART Range
GARTBase:=0x00200000—Start address of GART table
$2^{PTESize}$:=8 bytes—Size of each GART Page Table Entry
PageSize:=4 kilobytes—Memory page size To determine the number of PTEs in the GART table 210, the size of the physical address space in main memory 218 allocated to AGP related data, the upper 32 megabytes=33554432 bytes, is divided by the memory page size, 4K=4096 bytes, to obtain 8192 PTEs. Since there are 8 bytes in each PTE, the GART table consists of 65,536 bytes (8192× 8). Note that $8192=2^{13}=2^{PTESize}$ and thus, PTESize=13. Using the values supplied by the base and range registers, the operating system programs the configuration registers with the following values to set up the GART table 210:

PhysBase:=0x00000000—Start of remapped physical address
AGPAperture:=0x10000000—Start address of GART Range
GARTBase:=0x00000000—Start address of GART table
PTESize:=3—$2^{PTESize}$=Size in bytes of the PTE
PPTSize:=13—Number of PPT bits in each PTE
Base Register 165:=0x00000000—Starting point of memory in the first memory controller 154
Range Register 166:=0x01FFFFFF—Range of memory available for AGP transactions Note that the operating system chose to set up the GART-Base and PhysBase in the range of addresses suggested by the base register 165 and range register 166 located in first memory controller 154.

Figure 7:
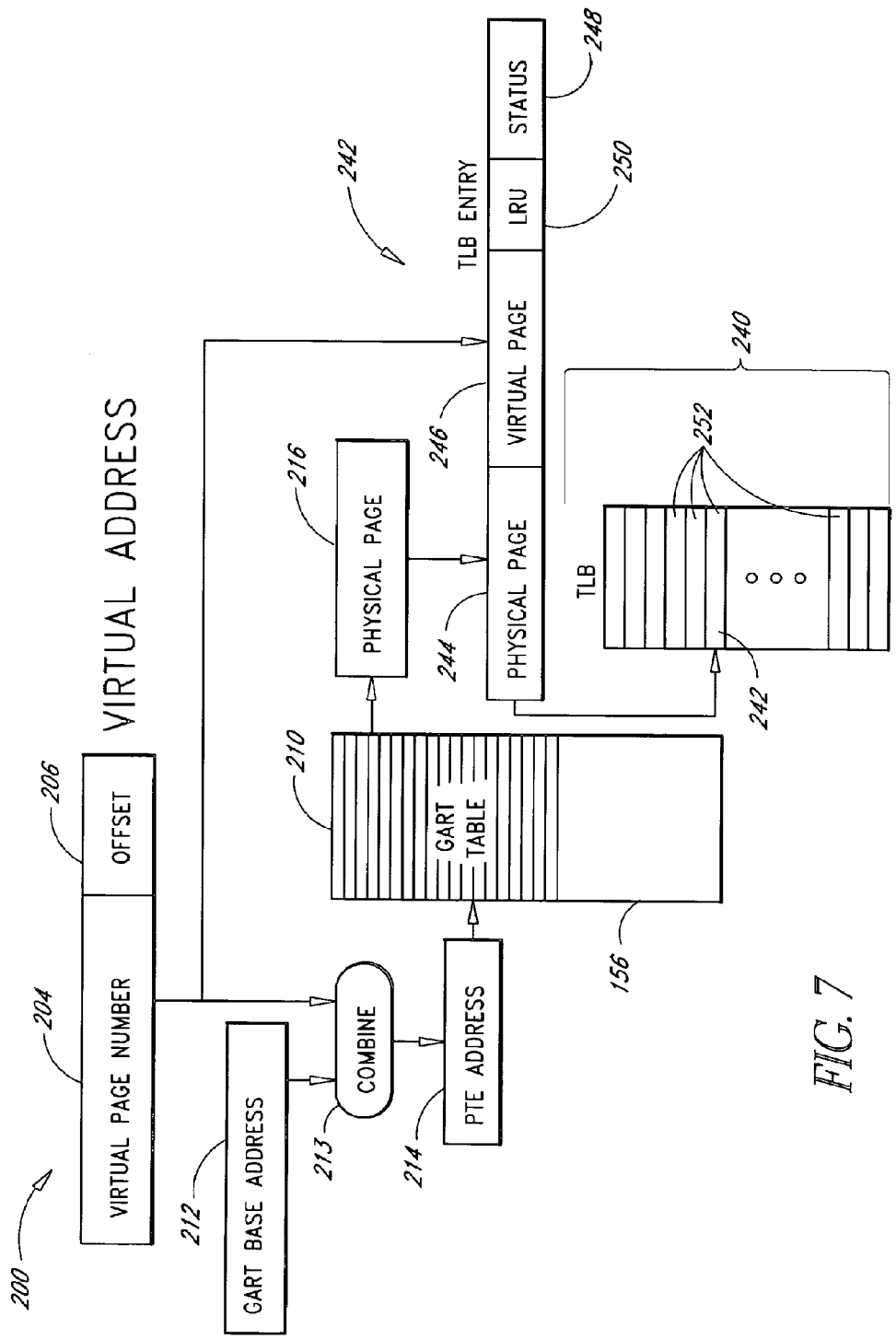
FIG. 7 is a block diagram illustrating the generation of a translation lookaside buffer entry of one embodiment of the invention.

FIG. 7 illustrates the translation of a virtual address 200 to a physical address 202 (FIG. 5*a*) using a translation lookaside buffer (TLB) 240. As before, a virtual address 200 includes a virtual page number field 204 and an offset field 206. Translation of the virtual page number field 204 occurs by finding a PTE of the GART table 210 corresponding to the contents of the virtual page number field 204. The GART base address 212 is combined at 213 with the contents of the virtual page number field 204 to obtain a PTE address 214. The PTE address 214 in turn provides the physical page number 216 corresponding to the virtual page number 204. At this point, a TLB entry 242 is formed having a virtual page field 246, its corresponding physical page field 244, a least recently used (LRU) counter 250 to determine the relative age of the TLB entry 242 and a status indicator 248 to determine when the TLB 240 has valid information. The TLB entry 242 is stored in a TLB 240 having a plurality of TLB entries 252. In one embodiment, there are a sufficient quantity of TLB entries 252 to cover all of the translatable addresses in the entire GART range 184 (FIG. 3). In this embodiment, the first memory controller 154 (FIG. 2) includes a block of registers to implement the TLB 240. In another embodiment, first memory controller 154 (FIG. 2) includes a fast memory portion, such as cache SRAM, to implement the TLB 240.

The invention advantageously overcomes several limitations of existing technologies and alternatives. For example, the AGP connection can support data transfers over 500 megabytes a second. By defining a set of memory that is available for AGP transaction, operating systems can optimize system performance by keeping the graphic data on the memory controller with the accelerated graphics port. The memory controller having the accelerated graphics port handles memory transactions concurrently with transactions being processed by the other memory controller.

Additionally, the invention enables storing, addressing and retrieving graphics data from relatively inexpensive main memory without the bandwidth limitations of current system bus designs. It is to be noted that in an alternative embodiment of the invention, the memory controllers may be on the same semiconductor chip as the memory that they control.

Figure 1:
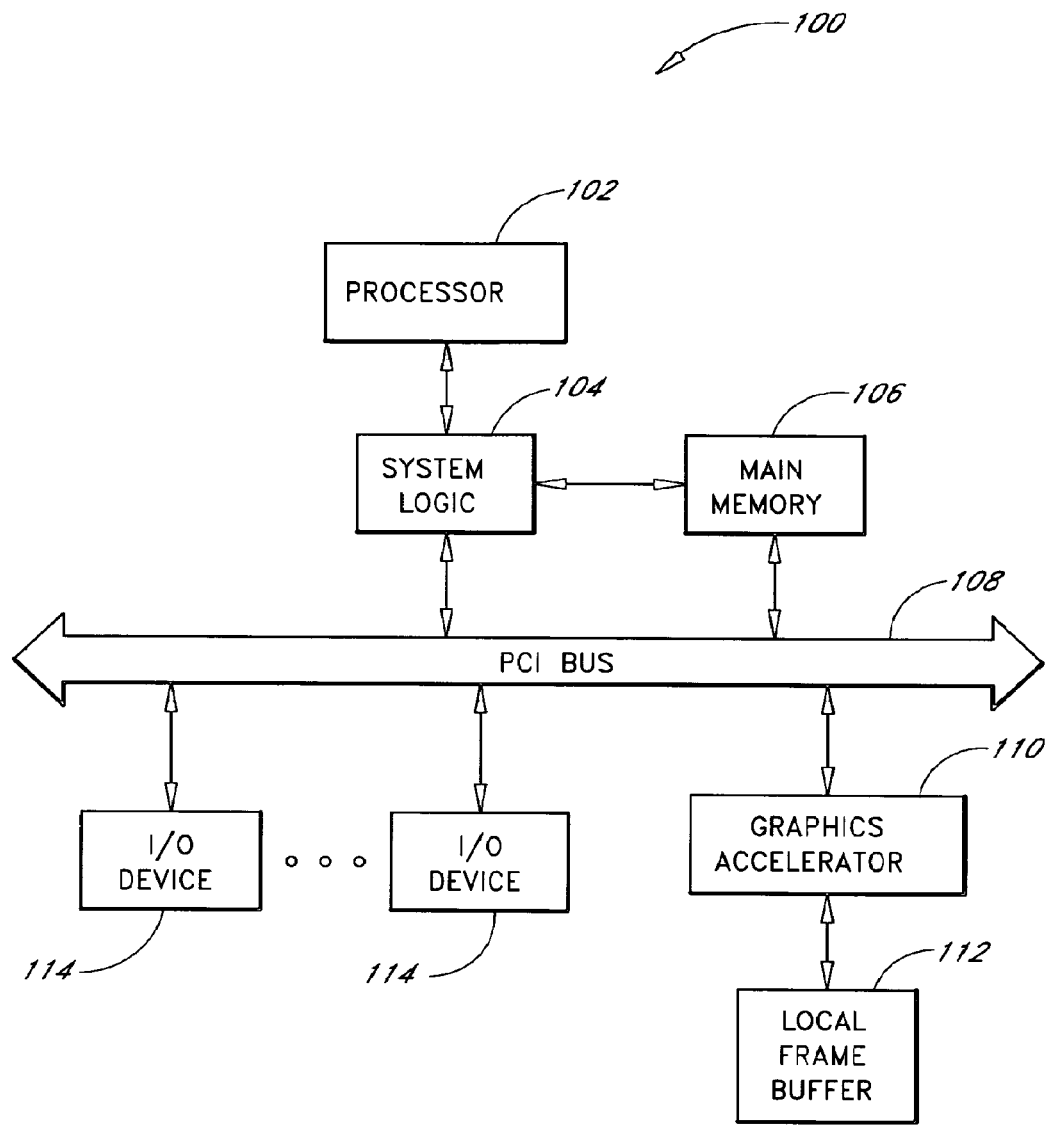
FIG. 1 is a block diagram illustrating the architecture of a prior art computer system.

In contrast to the conventional computer system architecture 100 (FIG. 1), embodiments of the invention enable relocation of a portion of the 3D graphics data, such as the texture data, from the local frame buffer to main memory connected to a dedicated memory controller to reduce the size, and thus the cost, of the local frame buffer and to improve system performance. For example, as texture data is generally read only, moving it to main memory does not cause coherency or data consistency problems.

Moreover, as the complexity and quality of 3D images has increased, leaving 3D graphics data in the local frame buffer 112 has served to increase the computer system cost over time. By moving 3D graphics data to a memory controller with its main memory, the architecture of the invention reduces the total system cost since it is less expensive to increase main memory 156 with a second controller 154 than to increase local frame buffer memory 112.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced with their scope.

What is claimed is:

1. A method of manufacturing a multiple memory controller computer comprising:
   providing a first memory controller and a second memory controller for controlling a main memory, wherein each memory controller comprises a configuration register that defines a range of addresses for accelerated graphic transactions, the first memory controller being connected to the second memory controller and a central processing unit via a bus, wherein the bus is separate from a chipset of each of the memory controllers, and each memory controller is independent of the central processing unit;

connecting the first memory controller to an accelerated graphics processor via a point-to-point connection that bypasses the bus;

providing an address remapping table of entries in the main memory, wherein the address remapping table is located in the range of addresses for the accelerated graphic transactions; and when a memory transaction is associated with graphics data, translating a virtual address of the memory transaction to a physical address based on the address remapping table and routing the memory transaction from the main memory to the accelerated graphics processor via the point-to-point connection based on the physical address, wherein the second memory controller handles requests that are not meant for the accelerated graphics processor, and wherein the first memory controller is configured to reroute requests that are not meant for the accelerated graphics processor to the second memory controller via the bus.

2. The method of claim 1, wherein the address remapping table has at least one page table entry (PTE) which provides information for a translation of the virtual address to the physical address, wherein the virtual address includes a first portion and a second portion, the first portion corresponding to a PTE in the address remapping table and wherein the second portion and information provided by the PTE are combined to provide the physical address.

3. The method of claim 2, further comprising allocating a virtual page number field to the first portion.

4. The method of claim 2, further comprising allocating an offset field to the second portion.

5. The method of claim 2, further comprising providing a translation buffer comprising a plurality of entries, each entry indicating a virtual page and a corresponding physical page.

6. The method of claim 1, further comprising manufacturing the first and second memory controllers and the main memory on a single semiconductor chip.

7. The method of claim 1 wherein the first memory controller receives data in a range register defining the amount of memory that is preferentially used over other addresses for storage of data for accelerated graphics processor transactions via the point-to-point connection.

8. A multiple memory controller computer comprising:

a first memory controller and a second memory controller for controlling a main memory, wherein the first memory controller comprises a configuration register that defines a range of addresses for accelerated graphic transactions, the first memory controller being connected to the second memory controller and a central processing unit via a bus, wherein the bus is separate from a chipset of each of the memory controllers, and each memory controller is independent of the central processing unit;

a graphic address remapping table of entries, wherein the graphic address remapping table is located in the range of addresses for accelerated graphic transactions; and an accelerated graphics processor connected to the first memory controller via a point-to-point connection that bypasses the bus;

wherein the second memory controller handles requests that are not meant for the accelerated graphics processor, the requests not meant for the accelerated graphics processor being routed from the first memory controller to the second memory controller via the bus; and wherein the first memory controller is configured to translate a virtual address of a memory transaction associated with graphics data to a physical address based on the address remapping table and to route the memory transaction from the main memory to the accelerated graphics processor via the point-to-point connection based on the physical address.

9. The computer of claim 8, further comprising a local buffer connected to the accelerated graphics processor and wherein the local buffer and the first memory controller are logically equivalent to the accelerated graphics processor.

10. The computer of claim 8 wherein the first memory controller is configured to receive data during boot up of a computer system.

11. The computer of claim 8 wherein the first memory controller receives data in a base address register defining the starting point of memory preferentially used over other addresses for storage of accelerated graphics data for accelerated graphics processor transactions.

12. The computer of claim 11, wherein the memory preferentially used comprises graphics memory.

13. The computer of claim 8 wherein the first memory controller receives data setting a boundary address register defining the lowest address of an address remapping table.

14. The computer of claim 8 wherein the first memory controller receives data in a range register defining the amount of memory that is preferentially used over other addresses for storage of data for accelerated graphics processor transactions via the point-to-point connection.

15. The computer of claim 8 wherein the first memory controller receives data from an initialization BIOS.

16. The computer of claim 8 wherein the first memory controller receives data from the operating system API.

17. The computer of claim 8 wherein the first and second memory controllers and the main memory are manufactured on a single semiconductor chip.

* * * * *